June 18, 1935.  G. G. WILLIAMS  2,005,174
ELECTRIC TUBING CONNECTER
Filed Sept. 23, 1933
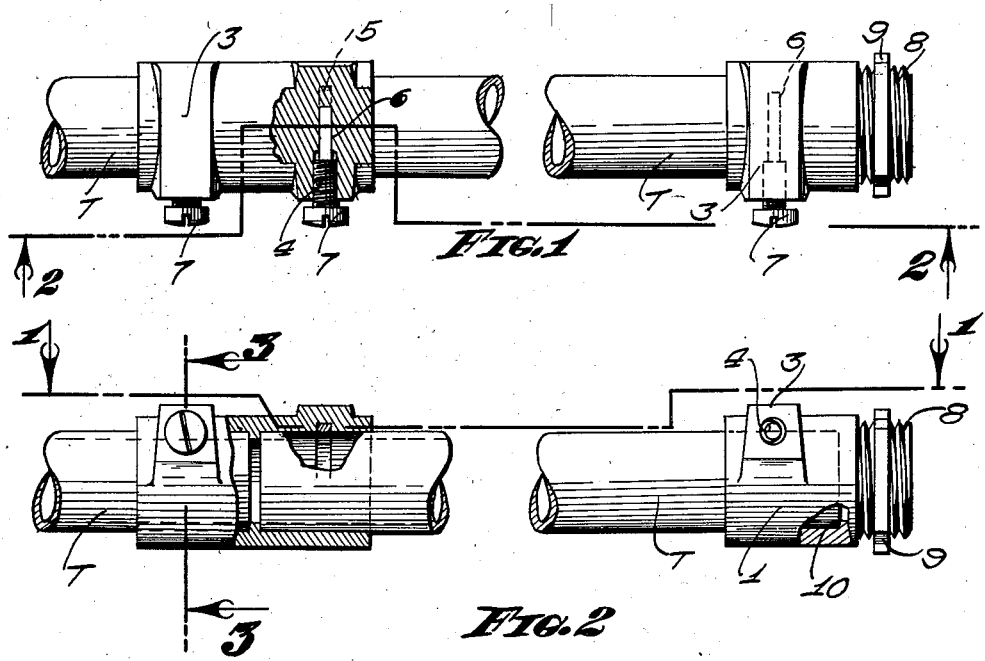
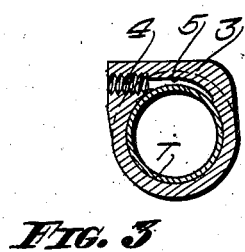
Fig. 3
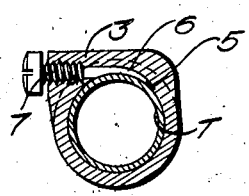
Fig. 4
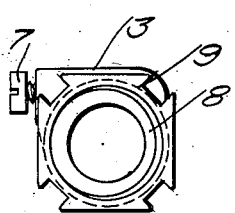
Fig. 5
Fig. 6
Fig. 7
Inventor
GERSHOM G. WILLIAMS
By A. B. Bowman
Attorney Patented June 18, 1935

2,005,174

UNITED STATES PATENT OFFICE 2,005,174

ELECTRIC TUBING CONNECTER

Gershom G. Williams, La Jolla, Calif.

Application September 23, 1933, Serial No. 690,690

4 Claims. (Cl. 247—27)

My invention relates to an electric tubing connecter, and the objects of my invention are:

First, to provide a connecter which is particularly suited for use in conjunction with electric conduits in the form of steel tubing, the walls of which are too thin for threaded connection or the like;

Second, to provide a connecter of this class which does not constrict or bend the tubing, but so firmly wedges or secures the tubing that lengths of tubing joined by the connecter may withstand an excessive tension strain without giving way at the connection between the tubing and connecter;

Third, to provide a connecter of this class which may be readily adapted to form the various fittings necessary for the installation of an electric conduit;

Fourth, to provide a connecter of this class which is particularly simple of installation even in awkward places and places difficult of access; and Fifth, to provide on the whole a novelly constructed electric tubing connecter which is particularly simple and economical of manufacture, durable, efficient in its actions, and which will not readily deteriorate or get out of order.

With these and other objects in view as appear hereinafter, my invention consists of certain novel features of construction, combination, and arrangement of parts and portions as will be hereinafter described in detail and particularly set forth in the appended claims, reference being had to the accompanying drawing and to the characters of reference thereon which form a part of this application, in which:

Figure 1 is a partial sectional partial side elevational view of my connecter embodied in a coupling member and in an end fitting and taken substantially along the line 1—1 of Fig. 2; Fig. 2 is another partial sectional partial elevational view thereof at right angles to Fig. 1 and taken through 2—2 thereof; Fig. 3 is a transverse sectional view through 3—3 of Fig. 2 with the securing wedge and screw omitted; Fig. 4 is a similar sectional view with the wedge and screw in position; Fig. 5 is an end elevational view of the form of my connecter when used as an end fitting; Fig. 6 is a side elevational view of the wedge member, and Fig. 7 is a plan view thereof.

Similar characters of reference refer to similar parts and portions throughout the several views of the drawing.

My electric tubing connecter is particularly suited for use in conjunction with tubing which has relatively thin walls and is usually formed of steel. This form of tubing is supplanting the conventional pipe conduit having relatively thick walls and utilizing conventional screw fittings. With steel tubing the thinness of the walls prevents the formation of screw threads and the conventional clamp constricts the tubing or dents the walls so that the interior does not maintain a uniform cross-section. This not only interferes with the drawing of wires through the tubing but also provides places where the installation may be caused to wear thin. With my coupling the tubing is firmly held yet its side walls are not crushed or dented.

The fitting or connecter embodied in the drawing, when used as a coupling between two lengths of tubing T, is in the form of a sleeve 1 with a bore therethrough adapted to receive the end of the tubing, as shown best in Fig. 2. The bore of the sleeve 1 is provided at its central portion with a constriction or internal ridge 2 which limits the insertion of the tubing. The wall of the sleeve 1 is enlarged at one side to form a boss or bosses 3 near each end of the sleeve 1.

Near each end the sleeve 1 is provided with a substantially tangentially extending bore the outer portion of which is screw-threaded, as indicated by 4, and the inner portion of which forms a guide channel 5. The portion 5 intersects the bore of the sleeve 1 and curves in substantial conformity thereto to form a channel which diminishes in height defining a wedge-shaped space. Said wedge-shaped space curves downwardly or towards the bore of the sleeve, as shown best in Fig. 3, and is adapted to receive a wedge member 6. The wedge member is sufficiently small to fit the screw-threaded portion 4 and is sufficiently yieldable so that when engaged by a screw 7 and the screw is turned in the screw-threaded portion 4, said wedge 6 is forced inwardly and bent by reason of contact with the radially outer side of the guide portion 5 into conformity with the outer periphery of the tubing T, as shown in Fig. 4. It should be noted that the taper of the wedge and the taper of the guide slot or channel 5 as defined when the tubing is in place is approximately the same so that when the wedge 6 is bent, as shown in Fig. 4, its inner side conforms to the periphery of the tubing, and by reason of the relatively large area of contact engages the tubing with considerable frictional force without indenting the same but at the same time so firmly wedging the tubing relative to the connecter that a tension strain of several hundred pounds may be exerted without pulling the connection loose.

The embodiment of my connecter shown as an end fitting is similar to the above described structure except that one end of the sleeve 1 is constricted slightly and its outer periphery is screw-threaded, as indicated by 8, to receive a nut 9. The constriction of the sleeve in this embodiment forms a shoulder 10 which functions to limit the insertion of the tubing as does the shoulder or internal ridge 2. The screw-threaded portion 8 and nut 9 are of such dimensions as to permit connection with conventional conduit pipe or to switch boxes and other similar devices.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. An electric tubing connecter consisting of, a socket portion adapted to receive the end of electric tubing, a screw and wedge receiving means associated with said socket portion and disposed with its axis in substantially tangential relation with the axis of said socket portion, a relatively long thin tapering wedge means disposed at the inner portion of said receiving means and a screw engageable with said receiving means to force the wedge means tangentially into wedging curved relation between the socket and tubing.

2. An electric tubing connecter consisting of, means for receiving an end of an electric tubing and incorporating a relatively long thin tapering wedge guiding element exposed to said tubing, a relatively long thin tapering wedge member fitting said wedge guiding element and means mounted in said electric tubing receiving means for engaging and forcing the wedge member between said wedge guiding element and said tubing to relatively secure the same.

3. The combination with thin solid walled tubing for receiving electric wires, of a connecter consisting of, means for receiving an end of said tubing incorporating a relatively long thin tapering curved wedge guiding element following a portion only of the periphery of said tubing, a relatively long thin tapering wedging member, and means mounted in said tubing receiving means for engaging and forcing said wedging member into said wedge receiving element and curving the same into conformity with said tubing.

4. The combination with thin solid walled tubing for receiving electric wires, of a connecter consisting of, a cylinder member adapted to receive a tubing in either end portion, a screw and wedge receiving means carried by each end portion, each means disposed in substantially tangential relation and its inner portion exposed to the periphery of the tubing received by the cylinder member, a relatively long thin tapering wedge fitting the inner portion of said means, and a screw fitting the outer portion of said means and engageable with the thicker end of said wedge to relatively bind the cylinder member and tubing.

GERSHOM G. WILLIAMS.